US010049204B2

(12) United States Patent
Casals Andreu

(10) Patent No.: US 10,049,204 B2
(45) Date of Patent: Aug. 14, 2018

(54) COMPUTER READABLE STORAGE MEDIA FOR MULTI-FACTOR AUTHENTICATION AND METHODS AND SYSTEMS UTILIZING SAME

(71) Applicant: Symantec Corporation, Mountain View, CA (US)

(72) Inventor: Roger Casals Andreu, Los Gatos, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 13/827,100

(22) Filed: Mar. 14, 2013

(65) Prior Publication Data

US 2013/0312061 A1    Nov. 21, 2013

Related U.S. Application Data

(60) Provisional application No. 61/647,191, filed on May 15, 2012.

(51) Int. Cl.
*G06F 21/00* (2013.01)
*G06F 21/40* (2013.01)
(Continued)

(52) U.S. Cl.
CPC .............. *G06F 21/40* (2013.01); *G06F 21/31* (2013.01); *G06F 21/42* (2013.01); *G06F 2221/2111* (2013.01)

(58) Field of Classification Search
CPC ......... H04L 29/06823; H04L 29/06829; H04L 29/06836; H04L 29/06843; H04L 63/10;
(Continued)

(56) References Cited

U.S. PATENT DOCUMENTS 7,475,252 B2 *   1/2009   Jeffries et al. ................ 713/184
7,950,050 B2 *   5/2011   Yoshida et al. .................. 726/5
(Continued)

FOREIGN PATENT DOCUMENTS

EP             1914657 A2      4/2008

OTHER PUBLICATIONS

International Search Report for International Application No. PCT/US2013/040519, dated Feb. 8, 2013, 3 pages.
(Continued)

*Primary Examiner* — John B King
(74) *Attorney, Agent, or Firm* — Maschoff Brennan

(57) ABSTRACT

Systems and methods for providing multi-factor authentication are discloses herein. A method for multi-factor authentication may include a step for receiving an authentication window request from an electronic device. The authentication window request may be configured to identify a user. The method may further include enabling an authentication window responsive, at least in part, to receipt of the authentication window request. The method may further include receiving a login verification request from an application server. The method may further include providing a response to the application server responsive, at least in part, to receiving the login verification request. The response may indicate whether the user may be selectively authenticated.

19 Claims, 3 Drawing Sheets

(51) Int. Cl.
*G06F 21/31* (2013.01)
*G06F 21/42* (2013.01)

(58) Field of Classification Search
CPC .............. H04L 63/101; H04L 63/102; H04L 29/06782; H04L 29/06789; H04L 63/083; H04L 63/0838; H04L 63/0846; H04L 9/3226; H04L 9/3328; H04L 63/08; H04L 63/0807; H04L 63/0823; H04L 9/3263; H04L 9/3213; G06F 21/46; G06F 21/30; G06F 21/44; G06F 21/70
USPC ....................................................... 726/2–4
See application file for complete search history.

(56) References Cited

U.S. PATENT DOCUMENTS

| | | | | |
|---|---|---|---|---|
| 8,099,082 | B2* | 1/2012 | Zinn et al. | 455/412.1 |
| 8,437,275 | B2* | 5/2013 | Banerjee et al. | 370/254 |
| 8,452,980 | B1* | 5/2013 | Black et al. | 713/185 |
| 8,533,783 | B1* | 9/2013 | Channakeshava | 726/4 |
| 8,590,007 | B2* | 11/2013 | Heffez | H04L 63/107 |
| | | | | 380/258 |
| 2006/0037064 | A1* | 2/2006 | Jeffries et al. | 726/4 |
| 2009/0109941 | A1* | 4/2009 | Carter | 370/338 |
| 2009/0254975 | A1* | 10/2009 | Turnbull et al. | 726/3 |
| 2009/0265775 | A1* | 10/2009 | Wisely et al. | 726/9 |
| 2010/0077467 | A1* | 3/2010 | Satagopan et al. | 726/7 |
| 2010/0299730 | A1* | 11/2010 | Hamachi | H04L 9/321 |
| | | | | 726/5 |
| 2011/0238476 | A1* | 9/2011 | Carr et al. | 705/14.25 |
| 2012/0132704 | A1* | 5/2012 | Black | G06Q 20/3274 |
| | | | | 235/379 |
| 2012/0204040 | A1* | 8/2012 | Schwartz | G06F 21/445 |
| | | | | 713/193 |
| 2013/0227651 | A1* | 8/2013 | Schultz et al. | 726/4 |
| 2014/0162598 | A1* | 6/2014 | Villa-Real | 455/411 |

OTHER PUBLICATIONS

Casals Andreu, Roger, "Compuer Readable Storage Media for Multi-Factor Authentication and Methods and Systems Utilizing Same", International Application No. PCT/US2013/040519, filed on May 10, 2013, 19 pages.

* cited by examiner

COMPUTER READABLE STORAGE MEDIA FOR MULTI-FACTOR AUTHENTICATION AND METHODS AND SYSTEMS UTILIZING SAME

CROSS REFERENCE WITH RELATED APPLICATIONS

This application claims priority to U.S. Provisional Application No. 61/647,191, filed May 15, 2012, which application is incorporated herein by reference in its entirety for any purpose.

TECHNICAL FIELD

Described embodiments of the present invention relate to authentication, and more specifically to multi-factor authentication of a user using an IP network.

BACKGROUND OF THE INVENTION

Conventional token-based authentication mechanisms have been adopted by many organizations as a way of improving both control and security with respect to data. In many cases, users are authenticated after providing a valid user name and password, as well as an authentication key. Each authentication key typically is generated by a device, such as a security token or key fob, that is provided to a user. More recently, token-based authentication has been directed to more personal use. For example, a number of email services now allow users to require authentication keys for authentication purposes. Often the key is provided via a text message to the user's phone in response to an attempted authentication.

Token-based authentication is not without drawbacks, however. Authentication keys can be complex and as a result, both inconvenient and burdensome for users to accurately provide during each authentication process. Moreover, token-based authentication devices are often not capable of electrical communication. As a result, such devices are often difficult to update and/or incompatible with known geolocation methodologies.

DETAILED DESCRIPTION

Systems and methods for multi-factor authentication are disclosed herein. In accordance with one or more embodiments of the present invention, users may be selectively authenticated based on a multi-factor authentication. Certain details are set forth below to provide a sufficient understanding of embodiments of the invention. However, it will be clear to one skilled in the art that embodiments of the invention may be practiced without various aspects of these particular details. In some instances, well-known network components, communication protocols, authentication protocols, and software operations have not been shown in detail in order to avoid unnecessarily obscuring the described embodiments of the invention.

Embodiments of the present invention generally relate to multi-factor authentication. Multi-factor authentication is an authentication approach where a user must be authenticated using multiple authentication mechanisms before the identity of a user is verified and the user granted access, for instance, to an application. Typically, and as per the Federal Financial Institutions Examination Council's (FFIEC) guidelines, multi-factor authentication requires satisfaction of at least two of three authentication types. The first and most common type of authentication is directed to authenticating a user based on information known to a user. This may include authenticating a user based on user credentials, such as a user name, password, and/or authentication key. The second type of authentication is directed to authenticating a user based on something the user possesses, such as a credit card, debit card, or smart card. The third type of authentication is directed to authenticating a user based on a characteristic of the user, such as a location or a biometric characteristic, e.g., fingerprint.

Figure 1:
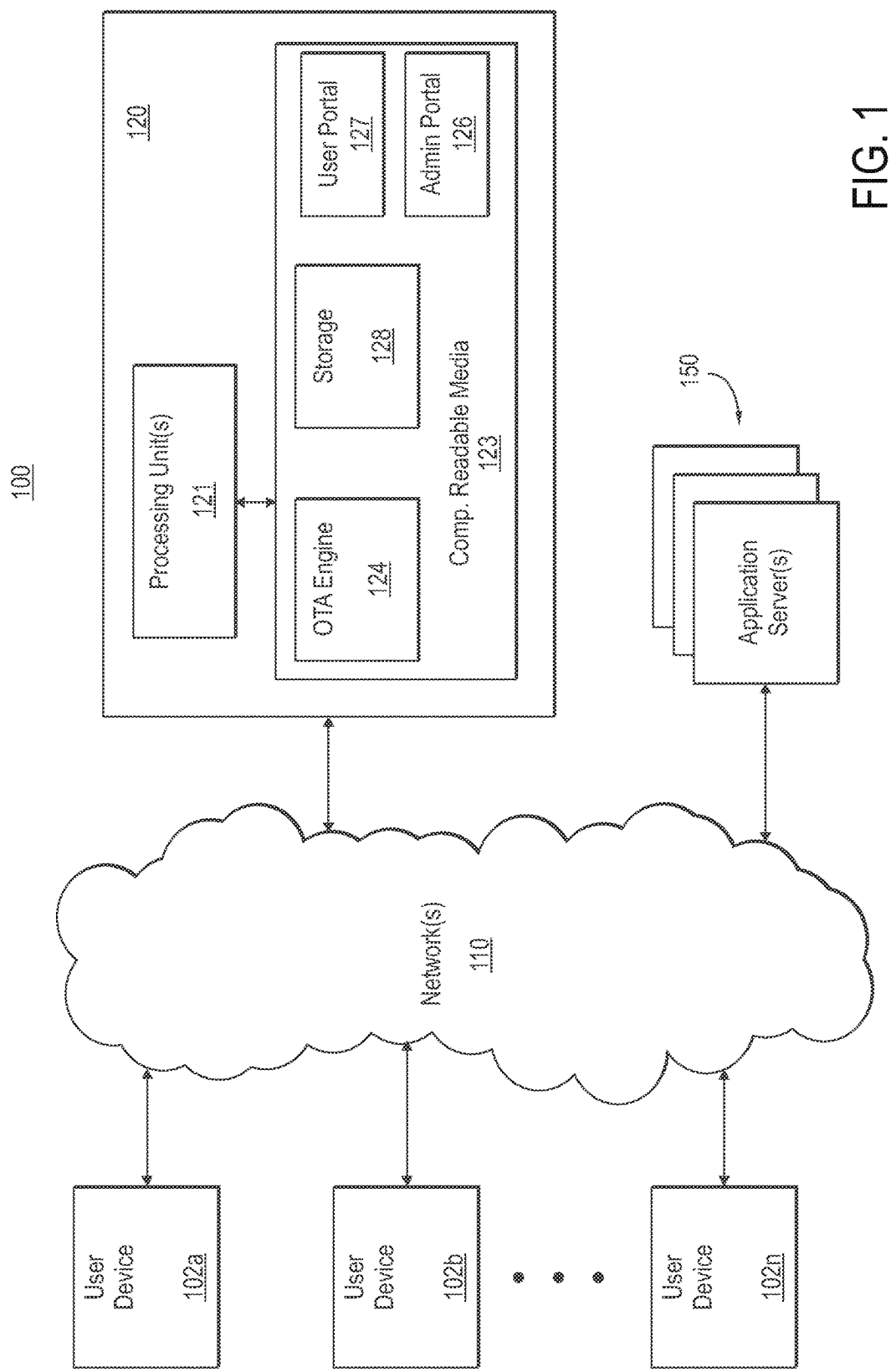
FIG. 1 illustrates a schematic diagram of a computer network system in accordance with an embodiment of the invention.

FIG. 1 illustrates a computer networking environment or system 100 according to an embodiment of the invention. Each of the plurality of user devices 102 may comprise a computing device, including but not limited to a modem, a router, a gateway, a server, a thin client, a laptop, a desktop, a computer, a tablet, a media device, a smart phone, a cellular phone or other mobile device, or any combination or sub-combination of the same. Each of the plurality of user devices 102 may include a memory (not shown in FIG. 1) encoded with executable instructions that may operate in conjunction with one or more processing units (not shown in FIG. 1) of the user device 102. The one or more processing units may provide functionality allowing execution of executable instructions encoded on the memory of the user device 102. Each user device 102 may include instructions for execution of one or more applications. Each of the one or more applications may comprise any application known in the art, now or in the future, and may be executed in any operating environment or system.

Each of the user devices 102 may be configured to communicate over a network 110 with any number of devices, including but not limited to the other components of the computer networking environment 100 described below. The network 110 may comprise one or more networks, such as local area networks (LANs), wide area networks (WANs), metropolitan area networks (MANs), cellular networks, and/or the Internet. Communications provided to, from, and within the network 110 may wired and/or wireless, and further may be provided by any networking devices known in the art, now or in the future. Devices communicating over the network 110 may communicate with any communication protocol, including TCP/IP and UDP protocols. Moreover, user devices 102 may be configured to communicate using protocols such as HTTP, HTTPS, SSL, or any protocol derived therefrom.

In particular, each user device 102 may be configured to provide an authentication window request to one or more devices over the network 110. The authentication window request may be generated by an application, or other executable instructions, executing on the user device 102 or any other device. In some embodiments, an authentication window request may be provided based at least in part on the proximity of a user device 102 to another device, e.g., a terminal. As will be explained in more detail below, in response to an authentication window request, an authentication window may be enabled. The authentication window may comprise a period of time during which a user may be authenticated. By way of example, in at least one embodiment, a user may be authenticated responsive to providing valid user credentials within a particular amount of time after the authentication window request is provided.

Each of the user devices 102 may communicate through the network 110 to a backend authentication server 120. The backend authentication server 120 may include one or more processing units 121 and computer readable media 123. Herein, the term computer readable media is used to refer to a single computer readable medium in some embodiments, and in other embodiments multiple computer readable media in communication with one or more processing units, such as the processing units 121. The computer readable media 123 may store executable instructions for a one-time authentication engine 124, executable instructions for an administrative portal 126, and executable instructions for a user portal 127. The computer readable media 123 may also include a storage 128. The executable instructions for a one-time authentication engine 124 may include instructions for authenticating a user of a user device 102 to one or more accounts based on a multi-factor authentication, further examples of which are provided below. The executable instructions for an admin portal 126 may include instructions for allowing an administrator to configure the one time button engine 124 and user portal 127, further examples of which are provided below. The executable instructions for the user portal 127 may include instructions for allowing a user to configure a respective user account, further examples of which are provided below. Although the executable instructions for the one-time authentication engine 124, the executable instructions for the administrative portal 126, and the executable instructions for the user portal 127 are shown on a same computer readable media 123, in some embodiments any or all sets of instructions may be provided on multiple computer readable media and may not be resident on the same media. Accordingly, computer readable media 123 as used herein includes one or more computer readable media 123. Computer readable media 123 and/or storage 128 may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage.

As described, the instructions stored on the computer readable media 123 may be executed on the one or more processing units 121 or other processing units. The executable instructions for a one-time authentication engine 124 may be referred to as an "OTA engine" herein, where the OTA engine refers to the executable instructions for a one-time authentication engine 124 executed by the one or more of the processing units 121 or other processing units. The executable instructions for an administrative portal 126 may be referred to as an "admin portal" herein, where the admin portal refers to the executable instructions for an administrative portal 126 executed by the one or more of the processing units 121 or other processing units. The executable instructions for a user portal 127 may be referred to as an "user portal" herein, where the user portal refers to the executable instructions for an user portal 127 executed by the one or more of the processing units 121 or other processing units.

One or more of a plurality of application servers 150 may comprise an application server configured to provide a user of a user device 102 with access to one or more applications stored or executing on such servers 150. In some embodiments, for example, a server 150 may be configured to stream, transmit, or otherwise provide application data to a user device 102 responsive to authenticating the user of the user device 102. Additionally, or alternatively, each of the plurality of application servers 150 may be configured to provide a user of a user device 102 with access to a user-specific account and/or data responsive to authenticating the user of the user device 102. Access to an account or data may be provided through execution of an application.

One or more of the plurality of application servers 150 may also comprise a terminal, such as an automated teller machine (ATMs) or a kiosk. A terminal as described herein may comprise any device capable of providing a user with access to one or more applications without the use of a user device 102. Applications provided by a terminal may include applications directed to providing information, funds, and/or services in a public or private space responsive at least in some instances to authenticating a user of the terminal.

It will be appreciated by those having ordinary skill in the art that reference made herein to an application may include any software used to perform, assist in performing, or otherwise provide a user with a function (e.g., service, routine, activity) on one or more of the application servers 150. In particular, applications described herein may be include any software elements requiring authentication for access.

One or more of the application servers 150 may communicate with the backend authentication server 120 and/or one or more user devices 102 over the network 110. The application servers may communicate using any protocol known in the art, including TCP/IP, UDP, HTTP, HTTPS, SSL, any protocol derived therefrom, or any combination or sub-combination of the same. In other embodiments, the backend authentication server 120 may communicate with the application servers 150 using other methodologies known in the art, now or in the future.

In some embodiments, an application server 150 may authenticate a user using multi-factor authentication. As will be explained in more detail below, multi-factor authentication may comprise authenticating a user based at least in part on the user providing valid user credentials, as well as providing the valid user credentials during an authentication window. As described, an authentication window may be enabled responsive to an authentication window request provided by a user device 102. An application server 150 may determine whether user credentials are provided during an authentication window based on one or more communications provided between the application server 150 and the backend authentication server 120.

Figure 2:
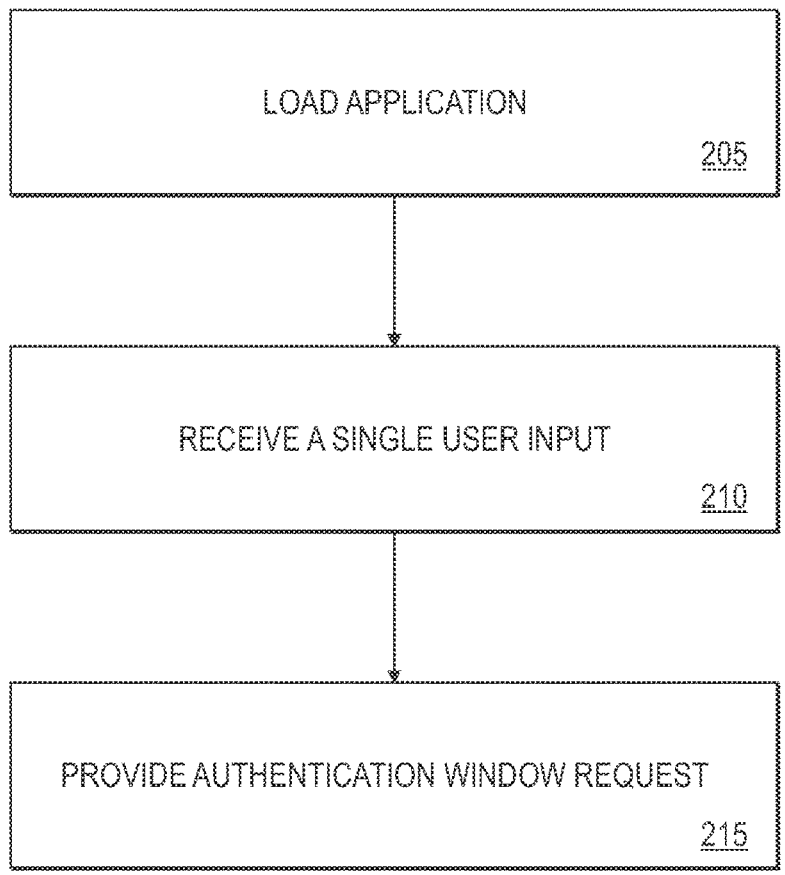
FIG. 2 illustrates a schematic flow chart of a method for providing an authentication window request in accordance with an embodiment of the invention.

A schematic flowchart of a method 200 for providing an authentication window request according to an embodiment of a method of the present invention is shown in FIG. 2. The method 200 may be implemented using one or more of the user devices 102 of FIG. 1. At a step 205, an application may be loaded on the user device 102. Loading the application may include executing instructions stored in a memory or computer readable media of the user device 102. Once the application has been loaded and/or is executing on the user device 102, at a step 210, the user may interact with the application. In one embodiment, a user may provide a single user input to the application. A single user input may comprise a push of a button, a press or slide of a finger, for instance, on a touch-sensitive display, or a click of a mouse. Additionally, or alternatively, user interaction with the application may include multiple user inputs. The user may configure settings of the application or browse through an interface. At a step 215, in response to one or more user inputs, the application executing on the user device 102 may provide an authentication window request. The request may be provided to the backend authentication server 120 and may, for instance, be provided using one or more encryption standards. By way of example, the request may be provided using symmetric and/or assymetric encryption and may be encrypted using techniques including but not limited to AES, DES, SSL, and TLS. In at least one embodiment, the request may be provided responsive to a single user input after the application has loaded. As an example operation, the application may be loaded, may receive a single user input from the user, such as a button press, and in response, the application may provide the authentication window request.

Figure 3:
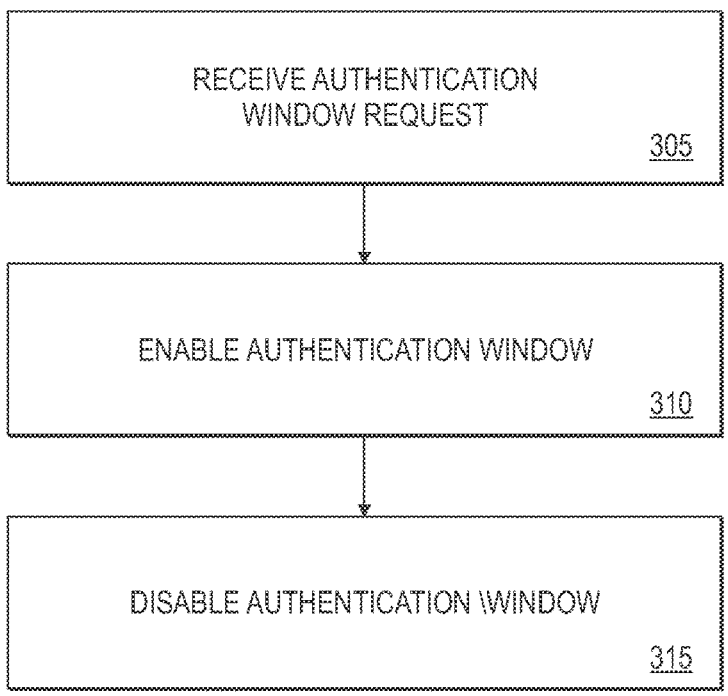
FIG. 3 illustrates a schematic flow chart of a method for enabling and disabling an authentication window in accordance with an embodiment of the invention.

A schematic flowchart of a method 300 for enabling and disabling an authentication window according to an embodiment of a method of the present invention is shown in FIG. 3. The method 300 may be implemented using the backend authentication server 120 of FIG. 1, and in particular by the OTA engine of the backend authentication server 120. At a method step 305, an authentication window request from a user device 102 may be received at the OTA engine. As described, the request may be provided by an application executing on the user device 102. For example, a user of the user device 102 may interact with an application such that the user causes an authentication window request to be provided over the network 110.

An authentication window request may be provided from the user device 102 without the user providing any user credentials. That is, provided the user has access to the application, the user may cause an authentication window request to be sent to the OTA engine and the OTA engine may respond accordingly as described herein. In another embodiment, a user may be required to provide user credentials in addition to the authentication window request for the OTA engine to acknowledge the request.

The authentication window request may further provide parameters for the authentication window. A user may indicate in an authentication window request whether an authentication window corresponds to all authentications of the user or whether the authentication window corresponds to authentications for one or more particular applications. As an example, a user may indicate that an authentication window request is to correspond to an authentication for a particular account, such as an email account. In some embodiments, authentication window requests may further indicate a desired length for the authentication window and/or locations at which the window is valid. An authentication window request may indicate that an authentication window is to remain enabled for 60 seconds.

Based at least in part on the authentication window request, the OTA engine may identify a user providing the request. The OTA engine may identify the user, for instance, based on a network identifier (e.g., MAC address, IP address) of the user device 102 providing the request and/or based on information included in the request (e.g., unique identification code identifying a user). In embodiments in which the request may provide parameters, the OTA engine may determine whether the request is limited to particular applications, and if so, which applications, and/or further determine a location from which the request originated. In at least one embodiment, the authentication window request may be encrypted when provided over the network 110 to the OTA module of the server 120 using, for example, symmetric and/or asymmetric encryption.

At a step 310, the OTA engine of the server 120 may enable an authentication window for the identified user in response to receipt of the authentication window request. The authentication window may be enabled for a particular duration based on a default duration or a requested duration in the received authentication window request.

At a step 315, the OTA engine may disable the authentication window. In one embodiment, the OTA engine may disable the authentication window in response to the duration of the authentication window elapsing, and may determine that the authentication window has elapsed in a number of ways. For example, in response to enabling the authentication window, the OTA engine may decrement a timer such that when the timer has elapsed, the authentication window is disabled. Alternatively, the OTA engine may disable the authentication window without the use of a timer, for instance, by disabling the authentication window at a particular time. In another embodiment, the OTA engine may disable the authentication window in response to a login verification request. As will be explained in more detail below, the OTA engine may provide a response to an application server 150 indicating that a user may be selectively authenticated. This response may be provided based on a determination that a login verification request corresponding to a user is received during an authentication window corresponding to the same user. Once the OTA engine has provided a response indicating a user may be selectively authenticated in this manner, the OTA engine may disable the authentication window.

While the method 300 has been described with respect to enablement of a single authentication window, it will be appreciated that a plurality of authentication windows may be enabled at a given time, and may be enabled and/or disabled at respective times based on receipt of respective authentication window requests. Each of the authentication windows may correspond to a respective user or multiple authentication windows may correspond to a same user (recall that an authentication window may be application-specific).

Figure 4:
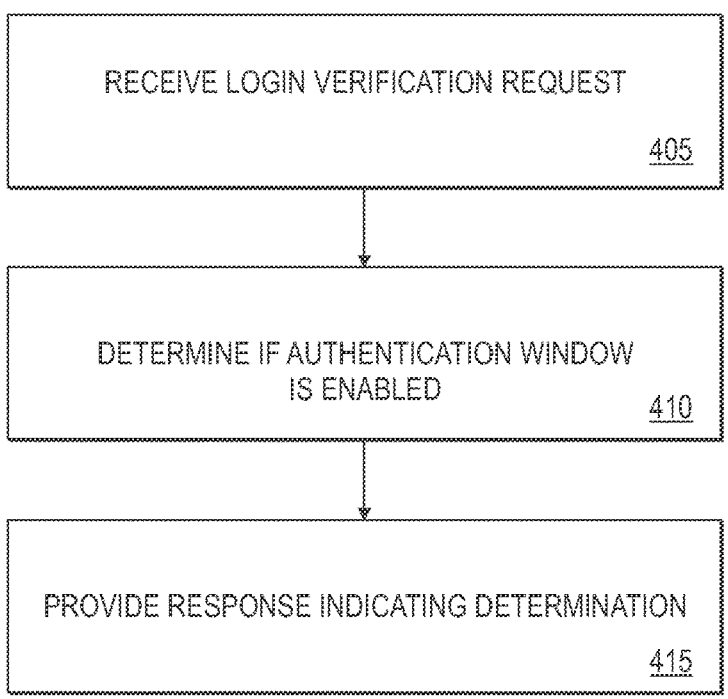
FIG. 4 illustrates a schematic flow chart of a method for processing login verification requests in accordance with an embodiment of the invention.

A schematic flowchart of a method 400 for processing login verification requests according to an embodiment of a method of the present invention is shown in FIG. 4. The method 400 may be implemented by the backend authentication server 120 of FIG. 1, and in particular by the OTA engine of the server 120.

At a step 405, the OTA engine may receive a login verification request from an application server 150. A login verification request may identify a user, and in some embodiments, may identify one or more applications. For example, after providing an authentication request to the OTA engine, such as at step 305 of the method 300 of FIG. 3, a user may request authentication with respect to one or more applications of an application server 150. The user may provide user credentials to the application server 150. In response, the application server 150 may provide the login verification request to the OTA engine of the backend authentication server 120 to determine whether the user is requesting authentication during a respective authentication window of the user. In providing a login verification request, the application server 150 may identify the user and/or any applications to which the user is requesting authentication. In some embodiments, the application server 150 may provide the login verification request before user credentials provided by the user are verified or may provide the login verification request after the user credentials provided by the user are verified.

As described, login verification requests may be provided by application servers 150 in the event that a user requests authentication to an application executing on that application server 150 or another application server 150. As an example, a user may wish to access an email account, and in response to receiving user credentials, the application server 150 may provide a login verification request to the backend authentication server 120. In another example, a user may wish to withdraw funds from an ATM. After providing the necessary user credentials, e.g., personal identification number and/or card, e.g., debit card, to the ATM, the ATM may provide the login verification request to the backend authentication server 120, or alternatively could forward the transaction to a financial institution, which in turn may provide the login verification request to the backend authentication server 120.

At a step 410, the OTA engine may determine if an authentication window is enabled for the user identified in the login verification request. This may include comparing one or more parameters in the login verification request to one or more parameters for all enabled authentication windows. As an example, an application server 150 may provide a parameter such as a user name, email address, and/or identification number to identify a user in the login verification request. The OTA engine may then determine whether any enabled authentication windows correspond to the user.

As described, authentication window requests may correspond to particular applications. That is, an authentication window, in some embodiments, may be enabled by the OTA engine only for one more specified applications. Accordingly, in response to receiving a login verification request indicating a user is requesting authentication to an application, the OTA engine may first determine whether an authentication window is enabled for a user, and if necessary, determine whether the authentication window corresponds to the specific application. For example, a user may provide an authentication window request directed to a particular credit card. If the OTA engine receives a login verification request for the user, but the request is directed to a user requesting authorization to an email account, the OTA engine may determine that no authentication window is enabled for the user. Put another way, the OTA engine may indicate that an authentication window for a user is enabled only if the application to which a user is requesting authentication also corresponds to the enabled authentication window.

This approach may be applied to other parameters as well. By way of example, the OTA engine may determine whether an authentication window is enabled for a user based on a location of the user (e.g., based on IP address location or global positioning system location). Locations may be determined using any form of geolocation, such as IP address geolocation or global positioning system (GPS) location.

Once a determination has been made with respect to whether an authentication window is enabled for a user, at a step 415, a response may be provided to the application server 150 indicating whether or not an authentication window is enabled for the user, or put another way, whether the application server 150 may selectively authenticate the user. In one embodiment, the OTA engine may not respond responsive to determining that no authentication window is enabled for a user.

While the method 400 has been described herein with respect to a user authenticating with an application server 150, in some embodiments, the user may authenticate with the backend authentication server 120. In this manner, the backend authentication server 120 may receive user credentials from the user and provide a login verification request to the OTA engine. Provided an authentication window is enabled for the user, the user may be authenticated. Users authenticated by the backend authentication server 120 may be authenticated using any authentication protocol known in the art, now or in the future, including SAML, OAuth, OpenID, NTLN, and Kerberos, and may be implemented using any protocol, including HTTP, HTTPS, and SSL. Moreover, an authentication of the user by the backend authentication server 120 may comprise a single sign-on (SSO) authentication. Once a user is authenticated with a SSO authentication, the user may authenticated for a plurality of applications (e.g., user account) executing on the backend authentication server 120 and/or executing on one or more application servers 150.

Accordingly, methods and systems have been described herein, where a user may be authenticated using multi-factor authentication. Briefly, a user, using a user device 102, may provide an authentication window request to the OTA engine of the backend authentication server 120. In response to the authentication window request, an authentication window may be enabled, and for a particular amount of time thereafter a user may provide user credentials to an application server 150 for authentication with an application. The user may provide the user credentials using a same user device 102 used to provide the authentication window request, may use a different user device 102, or may provide user credentials using a terminal. In response to receipt of the user credentials, an application server 150 may provide a login verification request to the OTA engine, and the OTA engine may indicate to the application server 150 whether or not the user may selectively authenticated. In one embodiment, the login verification request may be provided to the OTA engine after the user credentials have been verified, or may be provided before the user credentials have been verified.

In this manner, user credentials provided to the application server 150 may comprise a first factor of multi-factor authentication, and enablement of the authentication window may comprise a second factor of authentication. More specifically, authentication of user credentials may comprise a first type of multi-factor authentication and the use of the authentication window may comprise a second and/or third type of authentication. That is, because the user may possess the user device 102 for providing the authentication window request, verification of an enabled authentication window may comprise a second type of authentication. Additionally or alternatively, in some cases the verification of an enabled authentication window may comprise a third type of authentication, for instance, when the authentication window is based on a location of a user. Providing multi-factor authentication in this manner may enhance existing authentication approaches where users may be required to provide only user credentials to gain access to an application.

While the foregoing has described an authentication window request being provided between a user device 102 and the OTA engine of the server 120, in some embodiments, an authentication window request may be provided to the OTA engine of the backend authentication server 120 by other devices. For example, one or more devices (not shown) configured to communicate over the network 110 may provide authenticate using single-factor authentication with an application on an application server 150, and once authenticated, cause the application server 150 to provide the authentication window request. The user may then login to another account during the enabled authentication window to complete a multi-factor authentication.

In addition to providing multi-factor authentication, embodiments of the present invention may provide additional functionality as well. As previously described, the backend authentication server 120 may include a user portal. The user portal may allow each user to configure various parameters associated with multi-factor authentication. In one embodiment, users may associate accounts, such as email accounts and bank accounts, with a respective user account stored on the storage 128 of the backend authentication server 120. More specifically, a user may use the user portal to specify in a user account those accounts the user would prefer to use with multi-factor authentication. To complete the association, a user may configure the accounts to require multi-factor authentication by configuring an application server 150 to provide a login verification request in response to the user providing user credentials. As an example, a user may have an email address, such as user@useremail.com. The user may use the user portal to store this email in the user's respective user account on the server 120. Subsequently, when the user attempts to authenticate for use of the email address on an application server 150, the application server 150 may provide the email address user@useremail.com in a respective login verification request. The OTA engine may then use the email address to identify the user, and thereafter determine if an authentication window is enabled for the user, as described above.

In addition to associating accounts, the user portal may be used to associate a user device 102 with a user account as well. For example, a user may configure a user account such that the backend authorization server 120 may recognize the source of respective authorization window requests as a particular user device 102. In one embodiment, this may comprise the user providing a unique identification code to the server 120 from an application executing on the user device 102.

A user may also specify various parameters for multi-factor authentication through the user portal, for instance, a default duration for authentication windows and/or whether authentication windows are intended to be application-specific and/or location-specific.

The backend authentication server 120 may further include the admin portal. The admin portal may be configured to permit an administrator to modify several settings of the server 120 such that the administrator may manage individual and/or global settings of the server 120. These settings may supersede any settings provided by a user. As an example, an administrator may use the admin portal to force minimum and/or maximum settings for authentication window duration and/or the number of user devices 102 a user may associate with a respective user account. Moreover, administrators may install plug-ins, extensions, and/or add-ons to adjust and/or improve management of the OTA engine. Administration, then, may be done in a centralized manner at the admin portal, thereby simplifying implementation costs.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method, comprising:
receiving an authentication window request from a first electronic device, the authentication window request not including any user-provided credential;
receiving, from a second electronic device that is separate from the first electronic device, a login verification request including a user-provided credential associated with a user that was inputted at the second electronic device;
responsive to determining that the second electronic device is located within a certain proximity of the first electronic device, enabling an authentication window including a limited time period, having a beginning and an end, during which the user can be authenticated; and
responsive to determining that the login verification request has been received within the beginning and the end of the limited time period associated with the authentication window, providing an authentication response based on the user-provided credential.

2. The method of claim 1, wherein the authentication window request corresponds to an application executing on the second electronic device.

3. The method of claim 1, further comprising disabling the authentication window upon expiration of the limited time period associated with the authentication window.

4. The method of claim 1, wherein an application executing on the first electronic device is configured to generate the authentication window request responsive to a receiving an input by the user at the first electronic device and not responsive to any user-provided credential being inputted at the first electronic device.

5. At least one non-transitory computer-readable storage medium encoded with instructions that when executed by at least one processing unit cause the processing unit to:
receive an authentication window request from a first electronic device, the authentication window request not including any user-inputted credential;
receive, from a second electronic device that is separate from the first electronic device, a login verification request including a user-provided credential associated with a user that was inputted at the second electronic device;
responsive to determining that the second electronic device is located within a certain proximity of the first electronic device, enable an authentication window including a limited time period, having a beginning and an end, during which the user can be authenticated; and
responsive to determining that the login verification request has been received within the beginning and the end of the limited time period associated with the authentication window, provide an authentication response based on the user-provided credential.

6. The non-transitory computer-readable storage medium of claim 5, wherein an application executing on the first electronic device is configured to generate the authentication window request responsive to receiving a user input at the first electronic device and not responsive to any user-provided credential being inputted at the first electronic device.

7. A computer system comprising:
at least one processing unit coupled to at least one memory, wherein the at least one memory is encoded with computer executable instructions that when executed cause the at least one processing unit to:

receive an authentication window request from a first electronic device, the authentication window request not including any user-inputted credential;

receive, from a second electronic device that is separate from the first electronic device, a login verification request including a user-provided credential associated with a user that was inputted at the second electronic device;

responsive to determining that the second electronic device is located within a certain proximity of the first electronic device, enable an authentication window including a limited time period, having a beginning and an end, during which the user can be authenticated; and responsive to determining that the login verification request has been received within the beginning and the end of the limited time period associated with the authentication window, provide an authentication response based on the user-provided credential.

8. The computer system of claim 7, wherein an application executing on the first electronic device is configured to generate the authentication window request responsive to receiving a user input at the first electronic device and not responsive to any user-provided credential being inputted at the first electronic device.

9. The computer system of claim 7, wherein the computer executable instructions, when executed, further cause the at least one processing unit to disable the authentication window upon expiration of the limited time period associated with the authentication window.

10. The computer system of claim 7, wherein the authentication window request corresponds to an application executing on the second electronic device.

11. The method of claim 4, wherein the input includes at least one of a push of a button, a press of a finger, a slide of a finger, or a click of a mouse.

12. The method of claim 1, wherein:
the first electronic device is a smartphone associated with the user; and
the second electronic device is an automated teller machine (ATM).

13. The method of claim 1, wherein the authentication window request includes a unique identification code identifying the user.

14. The method of claim 1, wherein the authentication window request is encrypted.

15. The method of claim 1, wherein the enabling of the authentication window is further responsive to determining that the first electronic device is associated with the user.

16. The non-transitory computer-readable storage medium of claim 5, wherein the enabling of the authentication window is further responsive to determining that the first electronic device is associated with the user.

17. The computer system of claim 7, wherein the enabling of the authentication window is further responsive to determining that the first electronic device is associated with the user.

18. The non-transitory computer-readable storage medium of claim 5, wherein:
the first electronic device is a smartphone associated with the user; and
the second electronic device is an automated teller machine (ATM).

19. The computer system of claim 7, wherein:
the first electronic device is a smartphone associated with the user; and
the second electronic device is an automated teller machine (ATM).

* * * * *